United States Patent
Nagasaka

(10) Patent No.: US 8,760,732 B2
(45) Date of Patent: Jun. 24, 2014

(54) IMAGE READER

(75) Inventor: Hideaki Nagasaka, Aichi (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 259 days.

(21) Appl. No.: 13/433,916

(22) Filed: Mar. 29, 2012

(65) Prior Publication Data

US 2012/0307321 A1    Dec. 6, 2012

(30) Foreign Application Priority Data

May 31, 2011    (JP) ................. 2011-121696

(51) Int. Cl.
*H04N 1/04* (2006.01)
*H04N 1/46* (2006.01)

(52) U.S. Cl.
USPC ............. 358/475; 358/505; 358/509

(58) Field of Classification Search
USPC .......... 358/1.1, 474, 475, 480, 483, 491, 509, 358/512
See application file for complete search history.

(56) References Cited

U.S. PATENT DOCUMENTS

2002/0048053 A1    4/2002    Imai
2004/0239959 A1    12/2004   Yada et al.
2004/0247359 A1    12/2004   Koto et al.

FOREIGN PATENT DOCUMENTS

| JP | 9-321947 A    | 12/1997 |
| JP | 2000-244718 A | 9/2000  |
| JP | 2002-135530 A | 5/2002  |
| JP | 2004-208334 A | 7/2004  |
| JP | 2007-166213 A | 6/2007  |

*Primary Examiner* — Thierry L Pham
(74) *Attorney, Agent, or Firm* — Scully, Scott, Murphy & Presser, PC

(57) ABSTRACT

An image reader is provided, which includes a first light emitting unit emitting light toward a first side of a document sheet in a predetermined reading area, a second light emitting unit emitting light toward a second side of the document sheet in the predetermined reading area, a first light receiving unit receiving light emitted by the first light emitting unit and reflected by the document sheet and light emitted by the second light emitting unit and transmitted through the document sheet, and a controller that controls the first light emitting unit to emit light of a first color, controls the second light emitting unit to emit light of a second color, the first and second colors being mutually complementary colors, and controls the first light receiving unit to output read image data of the document sheet based on a light receiving result of the first light receiving unit.

8 Claims, 9 Drawing Sheets

IMAGE READER

CROSS-REFERENCE TO RELATED APPLICATION

This application claims priority under 35 U.S.C. §119 from Japanese Patent Application No. 2011-121696 filed on May 31, 2011. The entire subject matter of the application is incorporated herein by reference.

BACKGROUND

1. Technical Field

The following description relates to one or more techniques to output read image data based on a light receiving result obtained by receiving light emitted toward a document sheet and then reflected by the document sheet.

2. Related Art

So far, an image reader has been known that is configured to prevent show-through in double-side reading. In the known image reader, two contact image sensors, i.e., a contact image sensor for reading a first side and a contact image sensor for reading a second side are disposed to face each other across a document sheet. Each contact image sensor includes a light source and a photoelectric transducer for each color of RGB. The photoelectric transducer for each color is configured to have sensitivity conforming to a light source for the color, i.e., configured to receive only light of the color. In the double-side reading, the contact image sensor for reading the first side and the contact image sensor for reading the second side are controlled to emit light of respective different colors from respective corresponding light sources. Further, at this time, only read image data output from respective photoelectric transducers conforming to the corresponding light sources are rendered valid.

SUMMARY

However, the known image reader needs to employ a photoelectric transducer configured to receive only light of a specific color. Further, in the known image reader, each photoelectric transducer receives not only light emitted by the corresponding light source and then reflected by an image on a front side (i.e., a side opposed to the light source) of the document sheet but also light emitted by the same light source and then reflected by an image on a back side of the document sheet. Namely, there is a problem that the known image reader is unable to avoid influences of show-through resulting from light reflected by the back-side image.

Aspects of the present invention are advantageous to provide one or more improved techniques for an image reader that make it possible to avoid influences of show-through resulting from light reflected by a back-side image without using a photoelectric transducer configured to receive only light of a specific color.

According to aspects of the present invention, an image reader is provided, which includes a first light emitting unit configured to emit light toward a first side of a document sheet that is in a predetermined reading area, a second light emitting unit configured to emit light toward a second side of the document sheet that is in the predetermined reading area, a first light receiving unit configured to receive light emitted by the first light emitting unit and then reflected by the document sheet and light emitted by the second light emitting unit and then transmitted through the document sheet, and a controller configured to control the first light emitting unit to emit light of a first color toward the document sheet, control the second light emitting unit to emit, toward the document sheet, light of a second color different from the first color, the first color and the second color being mutually complementary colors, and control the first light receiving unit to output read image data of the document sheet based on a light receiving result of the first light receiving unit.

BRIEF DESCRIPTION OF THE ACCOMPANYING DRAWINGS

FIG. 1 schematically shows an internal configuration of an image reader in a first embodiment according to one or more aspects of the present invention.

FIG. 2 schematically shows a configuration of an image reading unit (where there is no document sheet) of the image reader in the first embodiment according to one or more aspects of the present invention.

Figure 5:
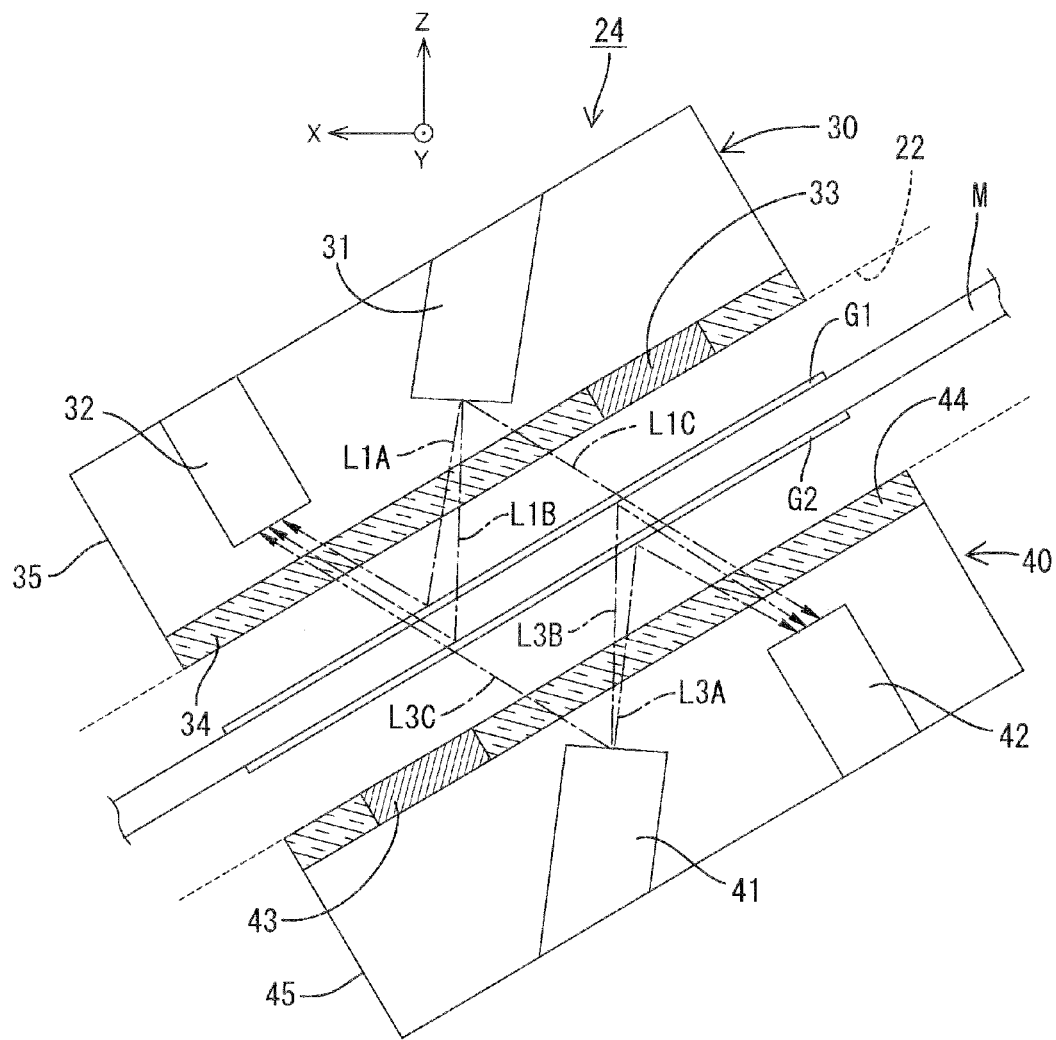

FIG. 5 schematically shows a configuration of the image reading unit (where there is a document sheet) in the first embodiment according to one or more aspects of the present invention.

Figure 6:
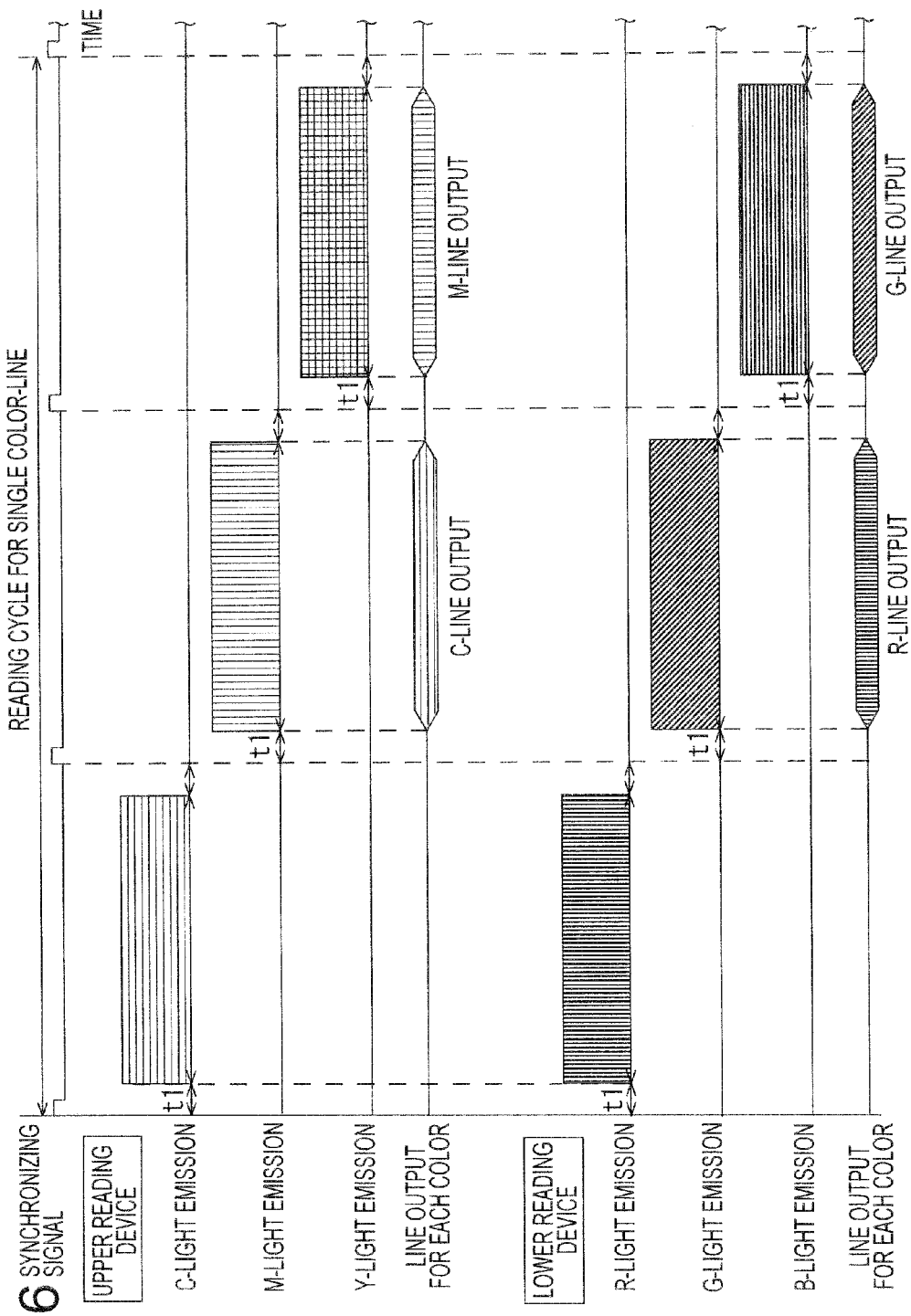

FIG. 6 is a timing chart showing light emitting timings and read data output timings of upper and lower reading devices in the first embodiment according to one or more aspects of the present invention.

Figure 7:
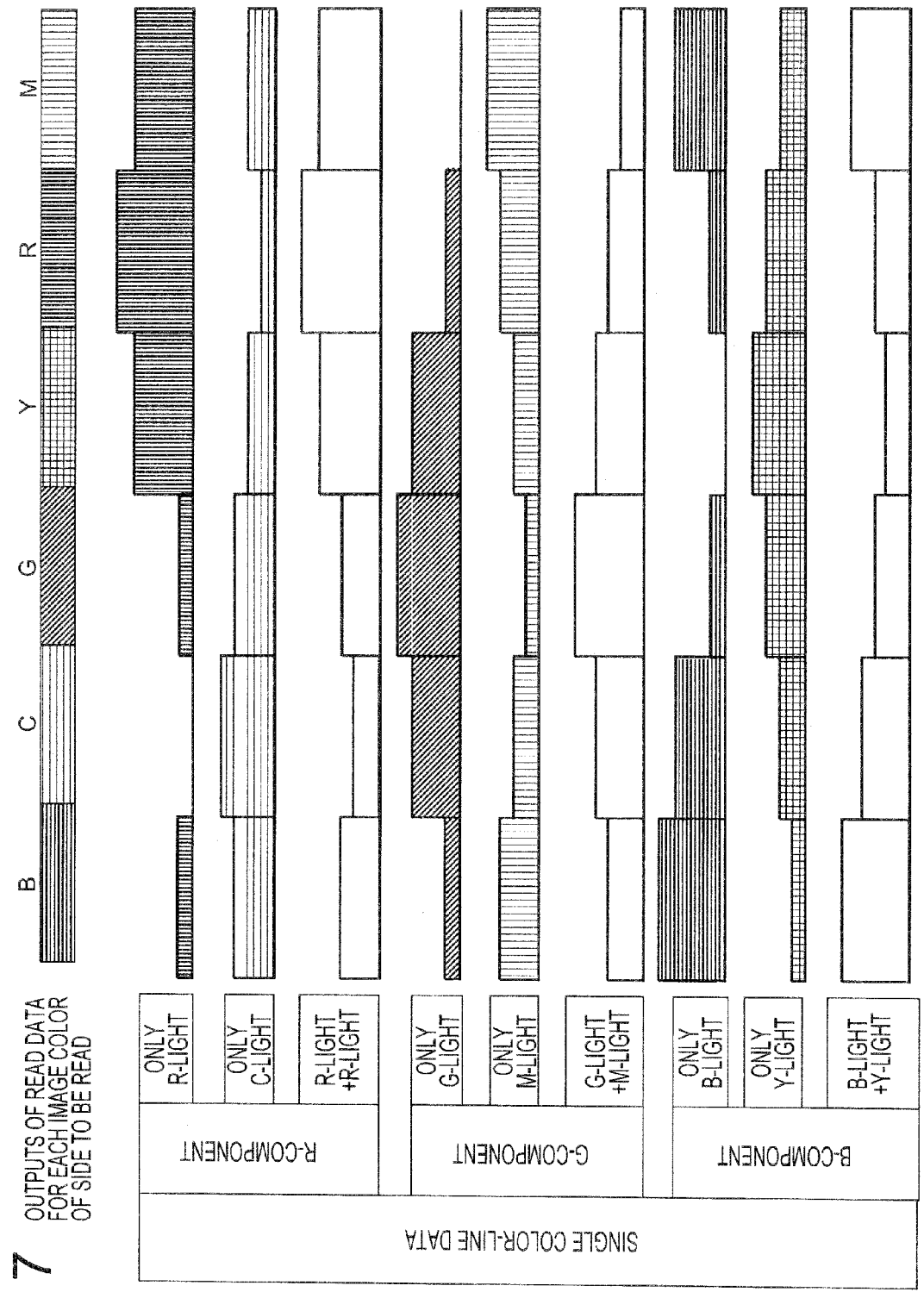

FIG. 7 is an illustration showing exemplary output results of read data based on an image of a side to be read in the first embodiment according to one or more aspects of the present invention.

Figure 8:
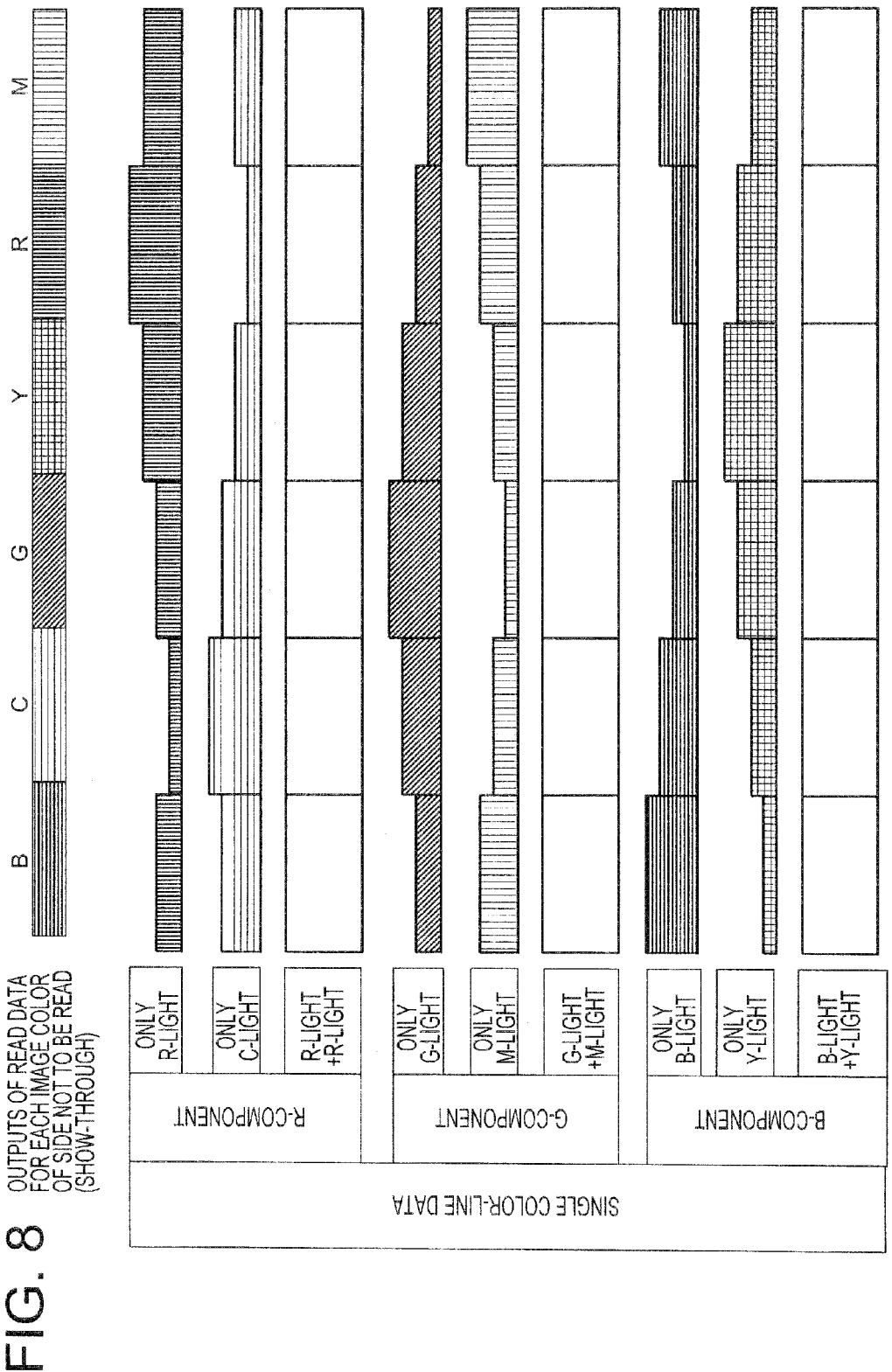

FIG. 8 is an illustration showing exemplary output results of read data based on an image of a side not to be read in the first embodiment according to one or more aspects of the present invention.

Figure 9:
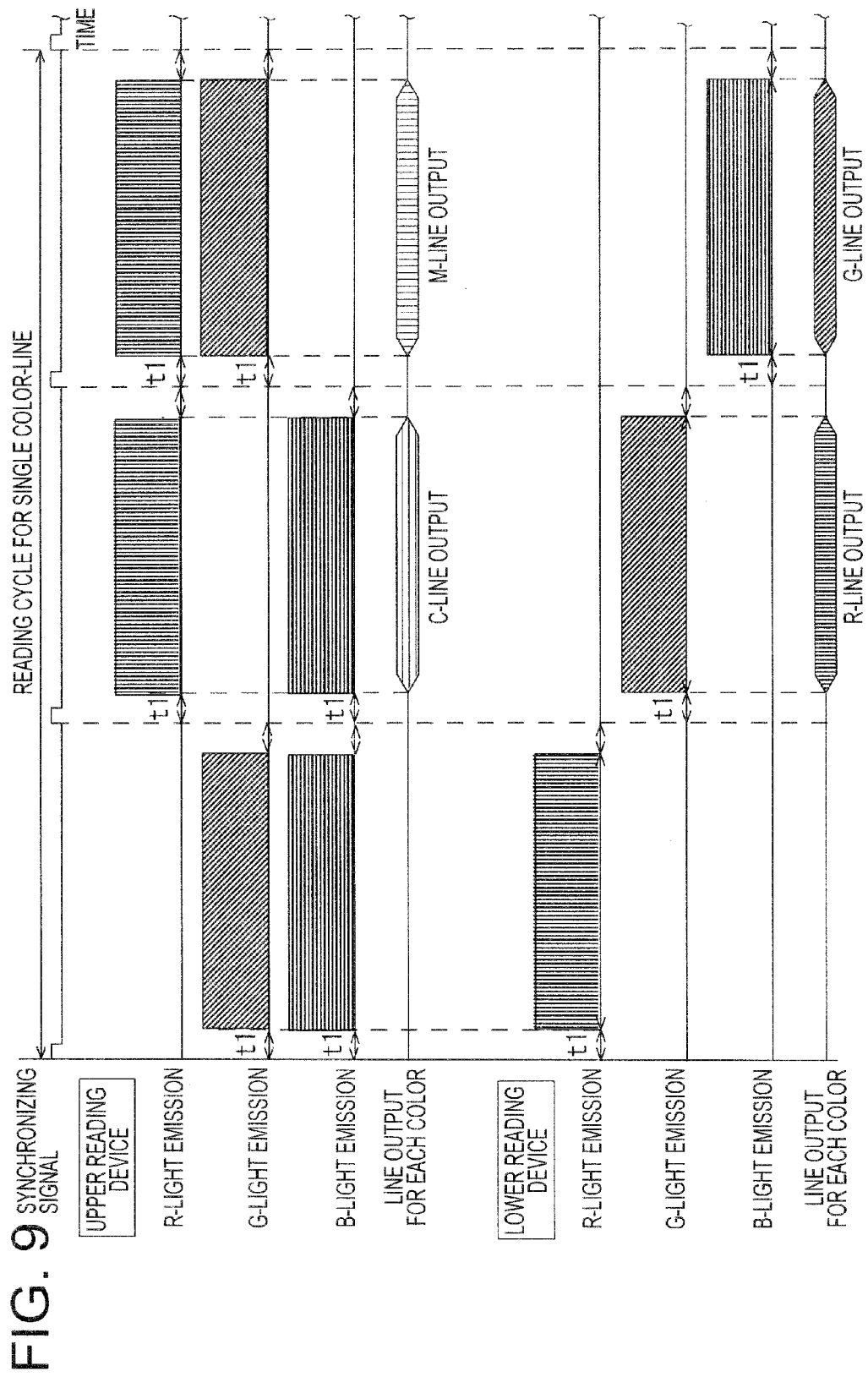

FIG. 9 is a timing chart showing light emitting timings and read data output timings of upper and lower reading devices in a second embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

<First Embodiment>

A first embodiment according to aspects of the present invention will be described with reference to FIGS. 1 to 8. In the following description, in FIGS. 1, 2, and 5, the X-axis direction indicates a direction from a rear side to a front side of an image reader 1. Additionally, the Y-axis direction indicates a direction from a left side to a right side of the image reader 1, and the Z-axis direction indicates a direction from a downside to an upside of the image reader 1. Further, "R," "G," "B," "C," "M," and "Y" shown in FIGS. 6 to 9 denote "red," "green," "blue," "cyan," "magenta," and "yellow," respectively. As shown on the upmost side of FIGS. 7 and 8, the colors are assigned to respective different hatching patterns. Examples of the image reader 1 include an image scanner, a facsimile machine, a copy machine, and a multi-function peripheral having multiple functions such as an image scanning function and a copy function.

1. Mechanical Configuration of Image Reader

Figure 1:
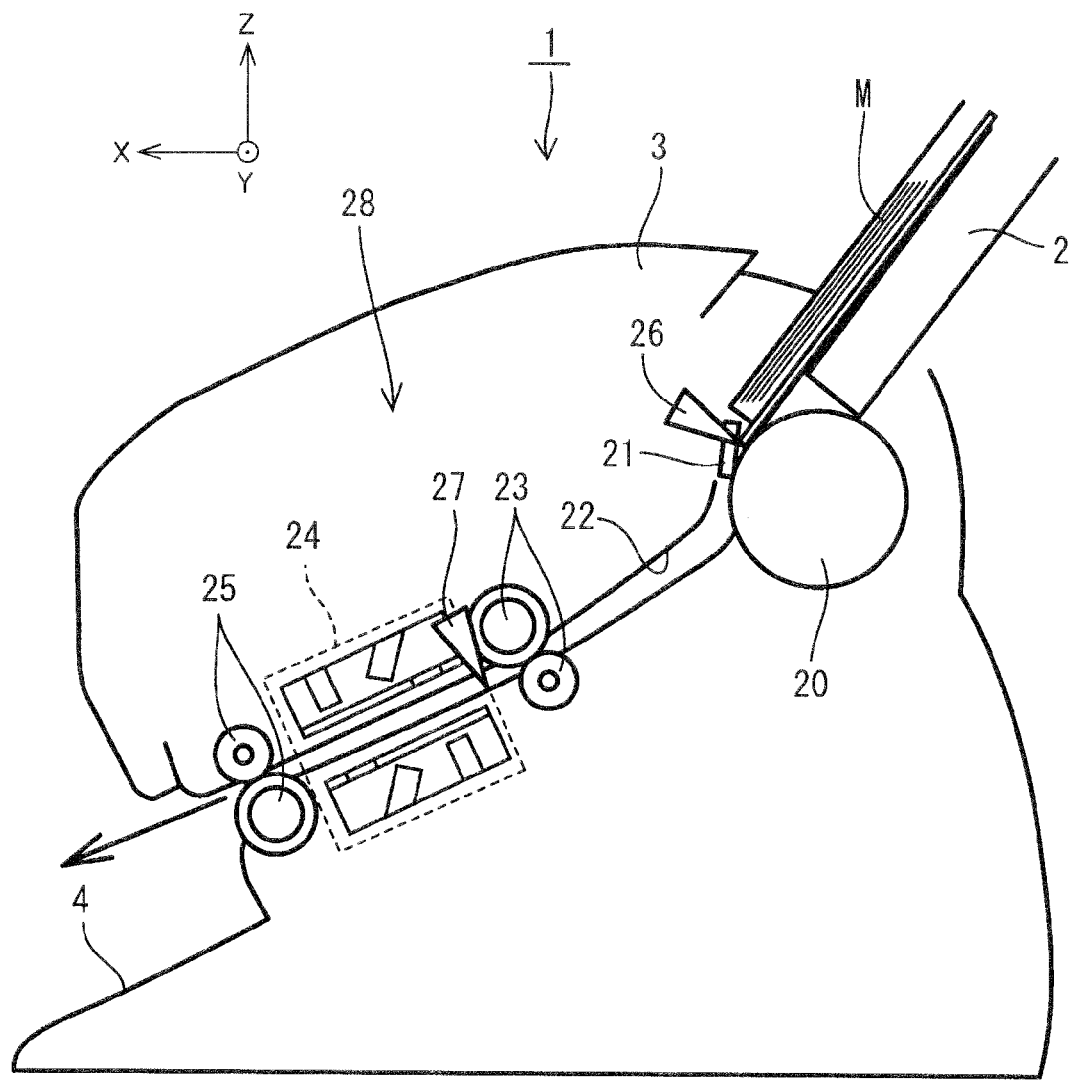

As shown in FIG. 1, the image reader 1 includes a document tray 2, a main body 3, and a catch tray 4. The image reader 1 is a sheet feed scanner configured to feed a document sheet M placed on the document tray 2 into the main body 3, read out an image on the document sheet M being fed, by an image reading unit 24 disposed in the main body 3, and eject onto the catch tray 4 the document sheet M on which the image has been read. It is noted that the document sheet M may be a plastic sheet as well as a paper.

The document tray 2 is disposed at a rear side of the main body 3 in a state where a front side thereof is slanted downward. The document tray 2 includes two guides (not shown) that are provided at both ends in the Y-axis direction (the left-to-right direction) to be movable in the Y-axis direction. The distance between the two guides is adjustable to be equal to the width of a document sheet in the Y-axis direction when made wider or narrower by a user manual operation. Between the two guides, one or more document sheets M are placed.

In the main body 3, a feeding path 22 is provided, which extends from a front end of the document tray 2 to a rear end of the catch tray 4. In addition, around the feeding path 22, a pickup roller 20, a separation pad 21, feed rollers 23, an image reading unit 24, ejection rollers 25, a front sensor 26, and a rear sensor 27 are disposed.

The pickup roller 20 is disposed in front of the document tray 2 and configured to pull one or more document sheets M placed on the document tray 2 into the main body 3 by a frictional force. The separation pad 21 is opposed to the pickup roller 20 and configured to separate the document sheets M by a frictional force, such that the document sheets M are fed into the main body 3 on a sheet-by-sheet basis.

The feed rollers 23 are disposed downstream relative to the pickup roller 20 on the feeding path 22. The feed rollers 23 are driven by a motor (not shown) to feed forward a document sheet M on the feeding path 22. The image reading unit 24 reads out an image of the document sheet M being fed by the feed rollers 23.

The ejection rollers 25 are disposed downstream relative to the image reading unit 24 on the feeding path 22. The ejection rollers 25 ejects the document sheet M, of which the image has been read by the image reading unit 24, out of the main body 3. The catch tray 4 is provided in front of the main body 3. The document sheet M, ejected out of the main body 3 by the ejection rollers 25, is put onto (earlier-ejected document sheets M stacked on) the catch tray 4. It is noted that the feeding path 22, the pickup roller 20, the feed rollers 23, and the ejection rollers 25 form a feeding mechanism 28.

The front sensor 26 is disposed in front of the document tray 2. The front sensor is configured to detect whether there is a document sheet M on the document tray 2 and issue a detection signal SG1 depending on the detection result. The rear sensor 27 is configured to detect whether there is a document sheet M in the middle of the feeding path 22 and issue a detection signal SG2 depending on the detection result. It is noted that the front sensor 26 and the rear sensor 27 may be contact sensors such as pressure sensors or non-contact sensors such as optical sensors and magnetic sensors.

2. Configuration of Image Reading Unit

Figure 2:
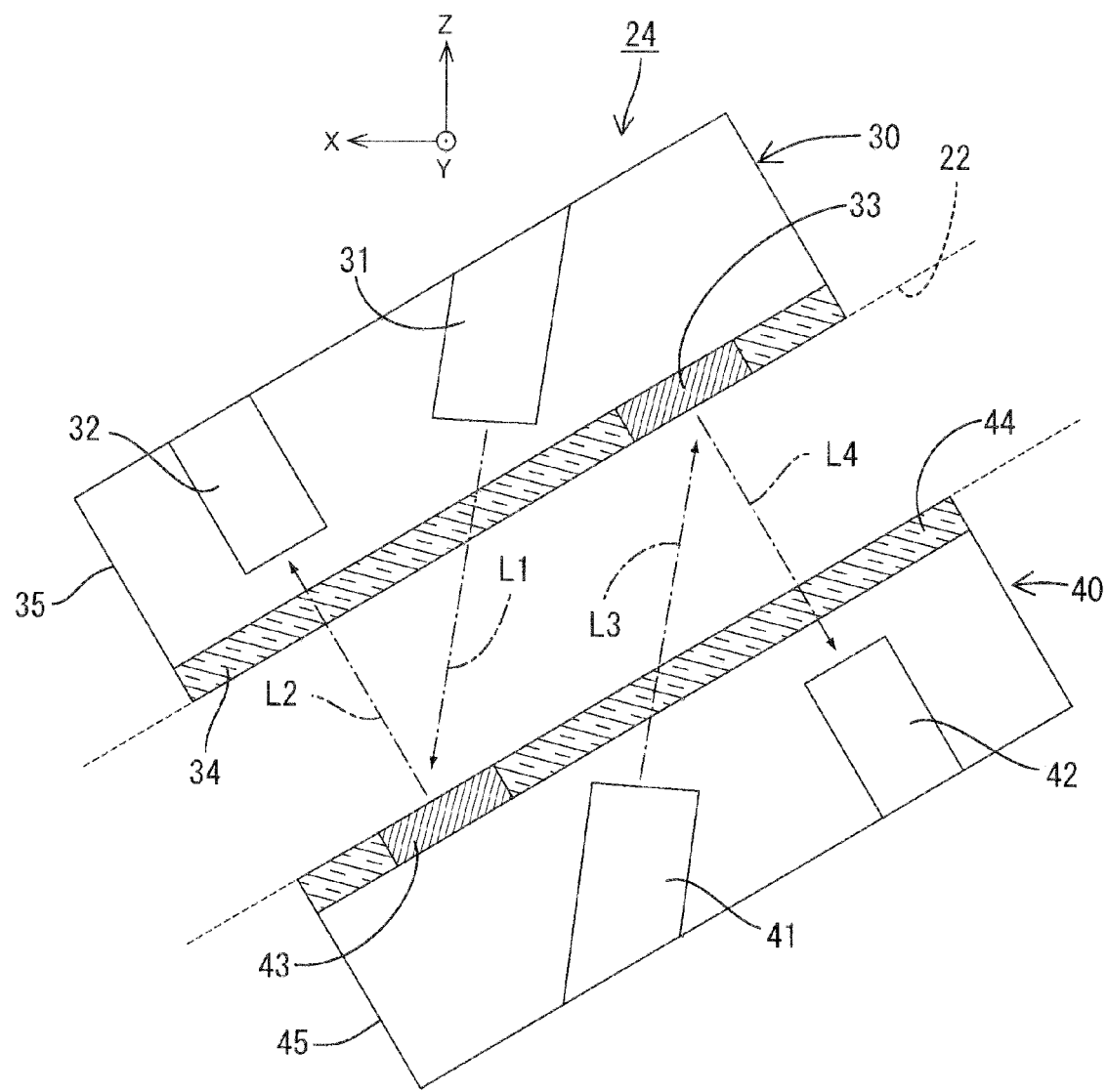

As shown in FIG. 2, the image reading unit 24 includes an upper reading device 30 and a lower reading device 40 that are disposed to face each other across the feeding path 22. The upper reading device 30 and the lower reading device 40 are provided to be immovable relative to each other in a feeding direction of the feeding path 22. An area between the reading devices 30 and 40 is a reading area therefore. It is noted that the reading devices 30 and 40 may be contact image sensors (CIS).

The upper reading device 30 is disposed on an upper side of the feeding path 22 and configured to read a first side (i.e., an up-facing side) of the document sheet M being conveyed. Specifically, the upper reading device 30 includes an upper light source 31, an upper light receiving unit 32, a reference member 33, a platen glass 34, and a carriage 35 on which the aforementioned components 31 to 34 are mounted. For instance, the upper light source 31 includes a plurality of light emitting chips arranged along the Y-axis direction. For instance, each light emitting chip, which includes one or more light emitting elements such as light emitting diodes and laser diodes, is configured to emit red light, green light, and blue light in a time-division manner or a simultaneous manner. Further, the upper light source 31 may include an optical system such as a light projection lens, as well as the one or more light emitting elements.

The upper light receiving unit 32 includes a plurality of light receiving elements (not shown) arranged along the Y-axis direction. For instance, each light receiving element, which includes a photodiode or a phototransistor, is configured to receive not only red light, green light, and blue light, but also cyan light, magenta light, and yellow light from the lower light source 41. Namely, each light receiving element of the upper light receiving unit 32 needs not have a filer configured to let only light of a specific color therethrough. The platen glass 34 is disposed along the feeding path 22. The upper light source 31 emits light L1 to be incident onto the document sheet M being conveyed on the feeding path 22 or a reference member 43 of the lower reading device 40 through the platen glass 34. The upper light receiving unit 32 is configured to receive light L2 reflected by the document sheet M or the reference member 43 and light L3 emitted by the lower light source 41.

The lower reading device 40 is disposed on a lower side of the feeding path 22 and configured to read a second side (i.e., a down-facing side) of the document sheet M being conveyed. Specifically, the lower reading device 40 includes a lower light source 41, a lower light receiving unit 42, the reference member 43, a platen glass 44, and a carriage 45 on which the aforementioned components 41 to 44 are mounted. For instance, the lower light source 41 includes a plurality of light emitting chips arranged along the Y-axis direction. For instance, each light emitting chip, which includes one or more light emitting elements such as light emitting diodes and laser diodes, is configured to emit cyan light, magenta light, and yellow light in a time-division manner or a simultaneous manner. Further, the lower light source 41 may include an optical system such as a light projection lens, as well as the one or more light emitting elements.

The lower light receiving unit 42 includes a plurality of light receiving elements (not shown) arranged along the Y-axis direction. For instance, each light receiving element, which includes a photodiode or a phototransistor, is configured to receive not only cyan light, magenta light, and yellow light, but also red light, green light, and blue light from the upper light source 31. Namely, each light receiving element of the lower light receiving unit 42 needs not have a filer configured to let only light of a specific color therethrough. The platen glass 44 is disposed along the feeding path 22. The lower light source 41 emits light L3 to be incident onto the document sheet M being conveyed on the feeding path 22 or the reference member 33 of the upper reading device 30 through the platen glass 44. The lower light receiving unit 42 is configured to receive light L4 reflected by the document sheet M or the reference member 33 and light L1 emitted by the upper light source 31.

The reference member 33 and the reference member 43 are not limited to white reference plates but may be grey reference plates. Further, the reference member 33 does not necessarily have to be buried in the platen glass 34 as shown in FIG. 2, but may be disposed on a front surface or a back surface of the platen glass 34. The reference member 43 does not necessarily have to be buried in the platen glass 44 as shown in FIG. 2, but may be disposed on a front surface or a back surface of the platen glass 44. The upper reading device 30 acquires white reference data required for shading correction, using the reference member 43 of the lower reading device 40. The lower reading device 40 acquires white reference data required for shading correction, using the reference member 33 of the upper reading device 30.

Figure 3:
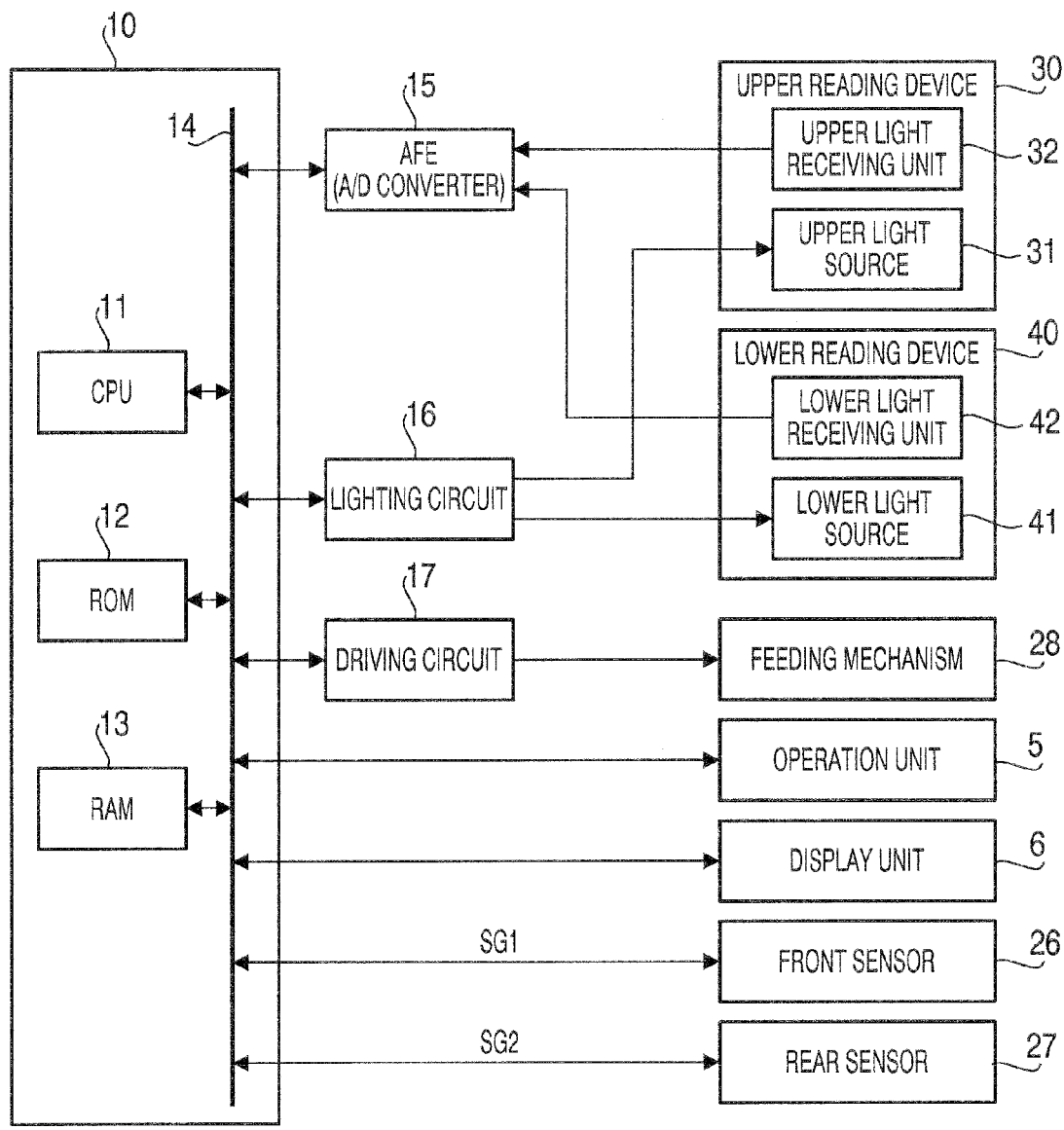
FIG. 3 is a block diagram schematically showing an electrical configuration of the image reader in the first embodiment according to one or more aspects of the present invention.

Further, the main body 3 includes an operation unit 5 that is provided with a power switch and various setting buttons and configured to accept a user instruction, and a display unit 6 that is provided with a liquid crystal display device and configured to display a status of the image reader 1 and an image read from a document sheet by the image reading unit 24 (see FIG. 3).

3. Electrical Configuration of Image Reader

As shown in FIG. 3, the image reader 1 includes a control circuit 10 configured to control elements included in the image reader 1. The control circuit 10 includes a CPU 11, a ROM 12, and a RAM 13. Further, the control circuit 10 is connected, via a bus 14, with the operation unit 5, the display unit 6, an analog front end (AFE) 15, a lighting circuit 16, a driving circuit 17 for driving each roller included in the feeding mechanism 28, the reading devices 30 and 40, the front sensor 26, and the rear sensor 27.

The ROM 12 stores various programs such as a control program for controlling operations of the image reader 1. The CPU 11 reads out the control program from the ROM 12 and controls elements included in the image reader 1 in accordance with the control program. It is noted that the control program may be stored on a non-volatile memory, other than the ROM 12, such as a CD-ROM, a hard disk drive, and a flash memory (trademark registered).

The lighting circuit 16 is connected with the reading devices 30 and 40. The lighting circuit 16 transmits, to the upper reading device 30, signals for controlling ON/OFF operations and a light emitting time of the upper light source 31 based on commands from the CPU 11. Upon receipt of the signals from the lighting circuit 16, the upper reading device 30 turns on the upper light source 31 and controls the upper light source 31 to emit light during the light emitting time. At this time, based on commands from the CPU 11, the upper reading device 30 receives light reflected by the document sheet M being conveyed on the feeding path 22 or the reference member 43, with the upper light receiving unit 32, and outputs to the AFE 15 a reading voltage that is an analog signal depending on the amount of light received by the upper light receiving unit 32. In the same manner, the lighting circuit 16 transmits, to the lower reading device 40, signals for controlling ON/OFF operations and a light emitting time of the upper light source 41 based on commands from the CPU 11. Upon receipt of the signals from the lighting circuit 16, the lower reading device 40 turns on the lower light source 41 and controls the lower light source 41 to emit light during the light emitting time. At this time, based on commands from the CPU 11, the lower reading device 40 receives light reflected by the document sheet M being conveyed on the feeding path 22 or the reference member 33, with the lower light receiving unit 42, and outputs to the AFE 15 a reading voltage that is an analog signal depending on the amount of light received by the lower light receiving unit 42.

The AFE 15 is connected with the reading devices 30 and 40. The AFE 15 includes an A/D converter circuit configured to convert the reading voltages output from the reading devices 30 and 40 into read data (digital signals). The AFE 15 has a predetermined resolution B (for example, 255 colors beginning with 0 in the case of 8 bits). Namely, the AFE 15 performs A/D conversion to convert the reading voltages output from the reading devices 30 and 40 into the read data of 8 bits (0-255). Then, the read data obtained through the A/D conversion by the AFE 15 is stored on the RAM 13 via the bus 14.

4. Control Process by Control Circuit

Figure 4:
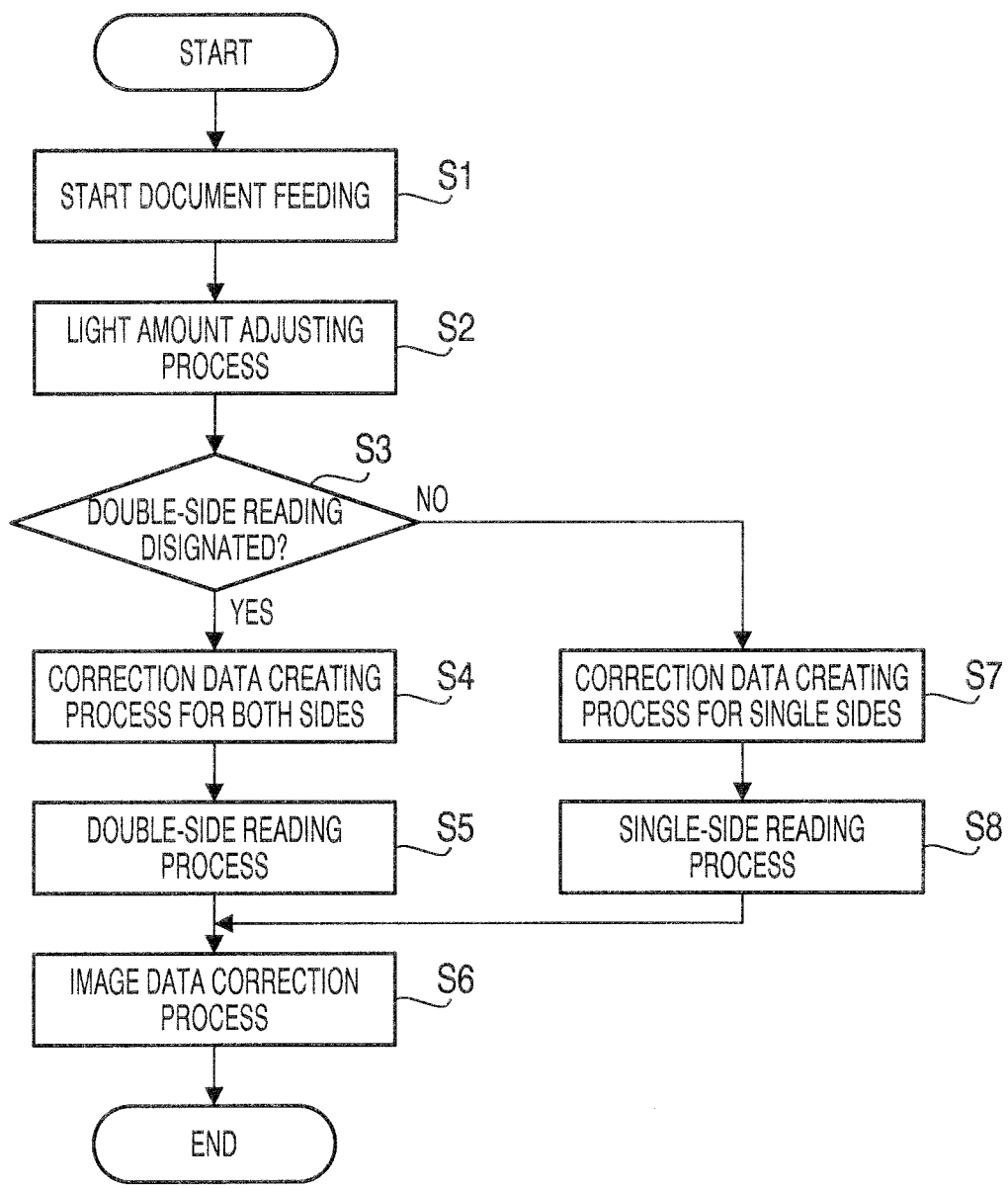
FIG. 4 is a flowchart showing a procedure of a control process related to image reading in the first embodiment according to one or more aspects of the present invention.

The CPU 11 executes a control process related to image reading shown in FIG. 4 in accordance with the aforementioned control program, after accepting an instruction to start image reading based on a user operation through the operation unit 5 or receipt of an instruction signal received from an external device. When determining that there is a document sheet M on the document tray 2 based on the detection signal from the front sensor 26, the CPU 11 controls the driving circuit 17 to start driving the feeding mechanism 28 (S1). Thereby, a document sheet M placed on the document tray 2 is conveyed along the feeding path 22.

After beginning to feed the document sheet M, the CPU 11 performs a light amount adjusting process (S2). In the light amount adjusting process, the CPU 11 adjusts the amount of light of each color with respect to the light sources 31 and 41 of the reading devices 30 and 40. Specifically, the CPU 11 controls the upper reading device 30 to perform a light-emitting-receiving operation to make the upper light source 31 emit each color of light on a color-by-color basis in a time-division manner and make the upper light receiving unit 32 sequentially receive the light reflected by the reference member 43 in synchronization with the light emitting timing of the upper light source 31. In the same manner, the CPU 11 controls the lower reading device 40 to perform substantially the same light-emitting-receiving operation to make the lower light source 41 emit each color of light on a color-by-color basis in a time-division manner and make the lower light receiving unit 42 sequentially receive the light reflected by the reference member 33 in synchronization with the light emitting timing of the lower light source 41. Then, the CPU 11 adjusts the amount of the light of each color emitted by the light sources 31 and 41 to be equal or close to a predetermined target amount based on the read data depending on the analog signals (light receiving signals) from the light receiving units 32 and 42.

After the light amount adjusting process, the CPU 11 determines whether double-side reading is designated, based on information regarding the instruction to start image reading (S3). When determining that double-side reading is designated (S3: Yes), the CPU 11 performs a correction data creating process to create correction data for the first side and the second side (S4). In the correction data creating process, the CPU 11 acquires black reference data based on the read data depending on the light receiving signals output from the light receiving units 32 and 42 when any of the light sources 31 and 41 does not emit light. Further, the CPU 11 acquires white reference data based on the read data depending on the light receiving signals output from the light receiving units 32 and 42 in the light-emitting-receiving operation. Then, the CPU 11 creates correction data for shading correction based on the black reference data and the white reference data and stores the correction data, for instance, onto the RAM 13.

After the correction data crating process, the CPU 11 performs a double-side reading process (S5). In the double-side reading process, when determining that there is a document sheet M in the middle of the feeding path 22 based on the detection signal SG2 from the rear sensor 27, the CPU 11 controls the reading devices 30 and 40 to perform a light-emitting-receiving operation to make the light sources 31 and 41 concurrently emit light and make the light receiving units 32 and 42 receive light reflected by the document sheet M, based on the moment when the rear sensor 27 has detected the document sheet M as a trigger. Thus, the CPU 11 controls the reading devices 30 and 40 to perform image reading for the document sheet M.

In FIG. 5, the reference character G1 indicates a first-side image formed on the first side (the up-facing side) of the document sheet M. Further, the reference character G2 indicates a second-side image formed on the second side (the down-facing side) of the document sheet M. As shown in FIG. 6, the reading devices 30 and 40 sequentially perform the light-emitting-receiving operation for each color of light each time a predetermined time t1 has elapsed from a rising edge of the synchronizing signal. Further, each of the reading devices 30 and 40 outputs read data of a single line of a single color component in synchronization with the light-emitting-receiving operation for a subsequent color component. Thus, read data of a single color-line is created based on the output line data of the three color components.

In FIG. 7, the "side to be read" denotes an opposed side (i.e., a front side) of the document sheet M when viewed from each of the reading devices 30 and 40. In FIG. 8, the "side not to be read" denotes an unopposed side (i.e., a back side) of the document sheet M when viewed from each of the reading devices 30 and 40. On the upmost side of each of FIGS. 7 and 8, there are hatching portions which are attached with the reference characters "B," "C," "G," "Y," "R," and "M." Each hatching portion denotes an image color corresponding to the attached reference character on the side to be read or the side not to be read.

In FIGS. 7 and 8, under each hatching portion, shown are output values (i.e., the amounts of the RGB light components) of the read data based on reflected light and transmitted light of each color for the corresponding image color. For example, for the item "only R light," shown is an output value of the read data obtained when only red light is rendered reflected by or transmitted through each image color. For the item "only C light," shown is an output value of the read data obtained when only cyan light is rendered reflected by or transmitted through each image color. For the item "R light+C light," shown is an output value of the read data obtained when red light and cyan light are rendered reflected by or transmitted through each image color.

In order to concurrently read the images on the both sides of the document sheet M, the upper light source 31 and the lower light source 41 need to be concurrently emitted. Therefore, as shown in FIG. 5, the lower light receiving unit 42 may receive light L3B emitted by the lower light source 41 and reflected by the first-side image G1 and light L1C emitted by the upper light source 31 and transmitted through the document sheet M, as well as light L3A emitted by the lower light source 41 and reflected by the second-side image G2. Thus, when the reflected light L3B and the transmitted light L1C are received by the lower light receiving unit 42, a show-through might be caused in which the lower reading device 40 might read not only the second-side image G2 to be read, but also the first-side image G1.

However, in the first embodiment, as shown in FIG. 6, when the lower light source 41 emits red light, the upper light source 31 emits cyan light. Since red and cyan are mutually complementary colors, combined light of red light and cyan light is received by the lower light receiving unit 42 as light of achromatic color, more specifically, as light close to white light. Here, the amount of the transmitted light L1C decays owing to transmission through the document sheet M, and is less than the amount of the light L3A reflected by the second-side image G2. Therefore, the mutually complementary relationship between the transmitted light L1C and the reflected light L3A has a small influence on the read data of an R-component line.

Namely, as shown for the item "R light+C light" and the item "only R light" in FIG. 7, the relationship between each image color and the corresponding output value of the read data obtained when the lower light receiving unit 42 receives the transmitted light L1C and the reflected light L3A is similar to the relationship between each image color and the corresponding output value of the read data obtained when the lower light receiving unit 42 receives only the reflected light L3A. Accordingly, the lower reading device 40 is allowed to read out the second-side image G2 of the document sheet M.

Meanwhile, in the same manner as the transmitted light L1C, the amount of the reflected light L3B decays when the reflected light L3B is transmitted through the document sheet M. Therefore, the mutually complementary relationship between the transmitted light L1C and the reflected light L3B has a large influence on the read data. Namely, as shown for the item "R light+C light" and the item "only R light" in FIG. 8, there is a smaller difference in the output value of the read data for each image color when the lower light receiving unit 42 receives the transmitted light L1C and the reflected light L3B, compared with when the lower light receiving unit 42 receives only the reflected light L3C. In other words, the transmitted light L1C and the reflected light L3B are received by the lower light receiving unit 42 to be rendered closer to white light by additive color mixing. Thus, it is possible to prevent the lower reading device 40 from reading the first-side image G1 of the document sheet M, i.e., to prevent show-through.

In the same manner, when the lower light source 41 emits green light, the upper light source 31 emits magenta light. Since green and magenta are mutually complementary colors, the lower reading device 40 is allowed to read out the second-side image G2 of the document sheet M while preventing show-through with respect to the read data of a G-component line. Further, when the lower light source 41 emits blue light, the upper light source 31 emits yellow light. Since blue and yellow are mutually complementary colors, the lower reading device 40 is allowed to read out the second-side image G2 of the document sheet M while preventing show-through with respect to the read data of a B-component line. It is noted that although the upper reading device 30 emits cyan light, yellow light, and magenta light, the read data of the upper light receiving unit 32 may preferably be created by additive color mixing.

After the double-side reading process, the CPU 11 performs an image data correction process (S6). The CPU 11 makes a correction for the read data acquired in the double-side reading process, based on the correction data. The, the CPU 11 sends the corrected read data, for example, to a terminal device (not shown) or a printer (not shown) communicably connected with the image reader 1. After the image data correction process, the CPU 11 terminates the control process.

When determining that single-side reading is designated (S3: No), the CPU 11 performs a correction data creating process to create correction data for the second side (S7). A procedure of the correction data creating process for the second side is substantially the same as that of S4. Next, the CPU 11 performs a single-side reading process (S8). In the single-side reading process, in the same manner as the double-side reading process, the CPU 11 halts the upper light receiving unit 32 or renders invalid the light receiving result of the upper light receiving unit 32 while controlling the two light sources 31 and 41 to emit light as shown in FIG. 6. Thereby, in the single-side reading, the lower reading device 40 is allowed to read the second-side image G2 of the document sheet M while preventing show-through, with respect to the read data of the line of each color component.

5. Advantages of First Embodiment

According to the first embodiment, each of the light receiving units 32 and 42 receives both light emitted by the corresponding light source and reflected by the document sheet M and light emitted by the other light source and transmitted through the document sheet M, and outputs a light receiving result depending on the amount of the light received. Further, the light sources 31 and 41 emit light of respective different colors, which are mutually complementary colors, onto the document sheet M. Therefore, each of the light receiving units 32 and 42 receives, as combined light of achromatic color, both light emitted by the corresponding light source and reflected by a back-side image of the document sheet M and light emitted by the other light source and transmitted through the document sheet M, which are in mutually complementary color relation. Thus, the image reader 1 is allowed to prevent show-through caused by light reflected by a back-side image, without having to have a photoelectric transducer configured to receive only light of a specific color.

In the double-side reading, light emitted by one reading device and transmitted through a document sheet might be received by a light receiving unit of the other reading device. It might cause a remarkable show-through problem. On the contrary, according to the first embodiment, in the double-side reading, the two light sources 31 and 41 emit light of respective different colors, which are mutually complementary colors, onto the document sheet M. Therefore, each of the reading devices 30 and 40 is allowed to prevent show-through caused by light reflected by the back-side image.

Further, in the single-side reading, the upper light source 31 is controlled to emit complementary light of light emitted by the lower light source 41. Therefore, compared with when the upper light source 31 is controlled not to emit light, it is possible to prevent show-through caused by light reflected by the back-side image (i.e., the first-side image G1) more effectively. Further, when reading an image of a plurality of colors, the image reader 1 is allowed to prevent show-through caused by light reflected by a back-side image, without having to have a photoelectric transducer configured to receive only light of a specific color.

According to the first embodiment, each of the image reading devices 30 and 40 is allowed to read a color image more accurately, for instance, than an image reading device configured to emit light of two colors.

<Second Embodiment>

A second embodiment according to aspects of the present invention will be described with reference to FIG. 9. The second embodiment is different from the first embodiment in the configuration of an upper light source and light emitting control therefore. The other elements (features) of the second embodiment are the same as those of the first embodiment. Therefore, explanation about the same elements, which will be attached with the same reference characters, will be omitted. In the following description, the differences between the first and second embodiments will be described.

An upper light source of the second embodiment is configured to emit red light, green light, blue light in a time-division manner or a simultaneous manner, in the same manner as the lower light source 41. In the double-side reading and the single-side reading shown in FIG. 4, the CPU 11 controls the upper light source and the lower light source 41 to emit light as shown in FIG. 9. The light emitting control for the lower light source 41 is the same as shown in FIG. 6. However, the light emitting control for the upper light source is different from that shown in FIG. 6.

When controlling the lower light source 41 to emit red light, the CPU 11 controls the upper light source to emit green light and blue light, which are mixed to generate cyan light. Further, when controlling the lower light source 41 to emit green light, the CPU 11 controls the upper light source to emit red light and blue light, which are mixed to generate magenta light. Moreover, when controlling the lower light source 41 to emit blue light, the CPU 11 controls the upper light source to emit green light and red light, which are mixed to generate yellow light. An appropriate ratio of the amount of light of one color to that of another color may be determined, e.g., through experiments.

In the second embodiment, the upper light source is allowed to have the same configuration as the lower light source 41. Thus, it leads to a reduced manufacturing cost.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

In the aforementioned embodiments, the image reader 1 is exemplified as a sheet feed scanner that reads out the image of the document sheet M being conveyed by the feeding mechanism 28. However, for instance, the image reader 1 may be configured, without any a feeding mechanism, to read one side or both sides of a document sheet set still in a predetermined position. Specifically, the image reader 1 may be a flatbed type image reader including an image reading unit, which moves relative to a statically placed document sheet M while reading an image of the document sheet M. In this case, a reading area for the image reading unit may move together with the image reading unit.

In the aforementioned embodiments, exemplified is the feeding mechanism 28 including a plurality of rollers. However, instead, a feeding mechanism that includes a belt driven to revolve may be provided.

In the aforementioned embodiments, the two reading devices 30 and 40 are disposed to face each other across the feeding path 22. However, the two reading devices 30 and 40 do not necessarily have to be strictly opposed to each other. Each of the two reading devices 30 and 40 may have only to be disposed in such a position that the light receiving unit thereof can receive light from the light source of the other reading device.

In the aforementioned embodiments, the image reading unit 24 is exemplified that is provided with the two reading devices 30 and 40 and configured to perform double-side image reading and single-side image reading. However, the image reading unit 24 may be provided with a single reading device and configured to perform only single-side image reading. In this case, a light source may be disposed in a position substantially opposed to the reading device across the feeding path. Further, the light source may be configured to emit light of a complementary color of the color of light emitted by the reading device.

In the aforementioned embodiments, in the single-side reading process, both of the two light sources 31 and 41 are made emit light. However, in the single-side reading process, the image reader 1 may be configured such that a user may selectively determine whether to make the upper light source 31 emit light. In this case, for example, when wishing to read a document sheet M having an image formed only on one side thereof or wishing to save power consumption caused by light emitting, the user may select a mode for making the upper light source 31 emit light.

In the aforementioned embodiments, the image reader 1 is exemplified that is configured to perform color image reading using three colors of light. However, the image reader 1 may be configured to perform image reading using one, two, four or more colors of light.

In the aforementioned embodiments, the control circuit 10 includes the single CPU 11, and image reading is performed by the single CPU 11. However, image reading may be performed by a plurality of CPUs 11. For example, a part or all of processes such as processes related to the light sources 31 and 41, processes related to the light receiving units 32 and 42, and the image data correction process may be performed by different CPUs, respectively. Further, the control circuit 10 is not limited to a circuit including a versatile CPU but may include a special circuit such as an application specific integrated circuit (ASIC) and a field-programmable gate array (FPGA).

What is claimed is:

1. An image reader comprising:
   A first reading device comprising:
      a first light emitting unit configured to emit light toward a first side of a document sheet that is in a predetermined reading area;
      a first light receiving unit configured to receive light emitted by the first light emitting unit and then reflected by the document sheet and light emitted by the second light emitting unit and then transmitted through the document sheet;
   A second reading device comprising:
      a second light emitting unit configured to emit light toward a second side of the document sheet that is in the predetermined reading area;
      a second light receiving unit configured to receive light emitted by the second light emitting unit and then reflected by the document sheet and light emitted by the first light emitting unit and then transmitted through the document sheet;
   a controller configured to:
      control the first light emitting unit to emit light of a first color toward the document sheet;
      control the second light emitting unit to emit, toward the document sheet, light of a second color different from the first color, the first color and the second color being mutually complementary colors; and
      control the first light receiving unit to output read image data of the document sheet based on a light receiving result of the first light receiving unit, wherein the controller is configured to perform a double-side reading process to: control the first light emitting unit to emit light of the first color toward the document sheet; control the second light emitting unit to emit, toward the document sheet, light of the second color different from the first color, the first color and the second color being mutually complementary colors; control the first light receiving unit to output read image data of the first side of the document sheet based on the light receiving result of the first light receiving unit; and control the second light receiving unit to output read image data of the second side of the document sheet based on a light receiving result of the second light receiving unit.

2. The image reader according to claim 1,
wherein the controller is configured to perform a single-side reading process to:
   control the first light emitting unit to emit light of the first color toward the document sheet;
   control the second light emitting unit to emit, toward the document sheet, light of the second color different from the first color, the first color and the second color being mutually complementary colors; and
   control only the first light receiving unit to output the read image data of the first side of the document sheet based on the light receiving result of the first light receiving unit.

3. The image reader according to claim 2,
wherein, in the single-side reading process, the controller halts the second light receiving unit.

4. The image reader according to claim 2,
wherein, in the single-side reading process, the controller renders invalid the light receiving result of the second light receiving unit.

5. The image reader according to claim 1,
wherein the first reading device and the second reading device are disposed to face each other across the document sheet that is in the predetermined reading area, and
wherein the predetermined reading area is between the first reading device and the second reading device facing each other.

6. The image reader according to claim 1,
wherein the first light emitting unit is configured to emit a plurality of colors of light,
wherein the second light emitting unit is configured to emit a plurality of colors of light,
wherein the controller is configured to:
   control the first light emitting unit to emit the plurality of colors of light in a time-division manner;
   control the second light emitting unit to emit the plurality of colors of light in a time-division manner; and control the first light emitting unit and the second light emitting unit to emit light of respective different colors that are mutually complementary colors at a same time.

7. The image reader according to claim 6,
wherein the first light emitting unit is configured to emit blue light, green light, and red light, and
wherein the second light emitting unit is configured to emit cyan light, magenta light, and yellow light.

8. The image reader according to claim 7,
wherein the second light emitting unit comprises:
 a blue light emitting element configured to emit blue light;
 a green light emitting element configured to emit green light; and
 a red light emitting element configured to emit red light, and
wherein the controller is configured to:
 control the blue light emitting element and the green light emitting element to emit the blue light and the green light, respectively, so as to make the second light emitting unit emit cyan light;
 control the green light emitting element and the red light emitting element to emit the green light and the red light, respectively, so as to make the second light emitting unit emit yellow light; and
 control the red light emitting element and the blue light emitting element to emit the red light and the blue light, respectively, so as to make the second light emitting unit emit magenta light.

* * * * *